(12) United States Patent
Hoover et al.

(10) Patent No.: US 8,707,558 B2
(45) Date of Patent: Apr. 29, 2014

(54) WATER HEATER THREADED WELD FITTING HAVING IMPROVED WELD INTEGRITY

(75) Inventors: Harold Hoover, Ada, MI (US); Richard Freiberg, Alto, MI (US); Michael McLellen, Kentwood, MI (US); Joe Beach, Hastings, MI (US)

(73) Assignee: Bradford White Corporation, Ambler, PA (US)

( * ) Notice: Subject to any disclaimer, the term of this patent is extended or adjusted under 35 U.S.C. 154(b) by 394 days.

(21) Appl. No.: 13/118,988

(22) Filed: May 31, 2011

(65) Prior Publication Data

US 2011/0226842 A1    Sep. 22, 2011

Related U.S. Application Data

(62) Division of application No. 12/358,842, filed on Jan. 23, 2009, now Pat. No. 8,146,772.

(51) Int. Cl.
*B21D 51/16* (2006.01)
*B21K 1/76* (2006.01)
*B23P 17/00* (2006.01)

(52) U.S. Cl.
USPC ........ 29/890.14; 220/601; 220/661; 220/289; 29/460; 29/428

(58) Field of Classification Search
USPC .......... 220/610–61, 288–288, 601, 298, 4.12, 220/678, 285, 610–661, 62.11, 289; 29/890.051, 460, 890.16, 428
See application file for complete search history.

(56) References Cited

U.S. PATENT DOCUMENTS

| 1,903,045 | A | * | 3/1933 | Hodges | 29/618 |
| 1,915,309 | A | | 6/1933 | Grosser | |
| 2,229,526 | A | * | 1/1941 | Schabacker | 29/458 |
| RE24,187 | E | * | 7/1956 | Burwell | 427/234 |
| 4,231,488 | A | | 11/1980 | Ward | |
| 5,158,200 | A | | 10/1992 | Vago et al. | |
| 5,431,296 | A | | 7/1995 | Lewis | |
| 5,746,344 | A | | 5/1998 | Syler | |
| 5,988,699 | A | | 11/1999 | Quandt | |

* cited by examiner

*Primary Examiner* — Mickey Yu
*Assistant Examiner* — Chun Cheung
(74) *Attorney, Agent, or Firm* — RatnerPrestia

(57) ABSTRACT

A threaded weld fitting and a method of welding a threaded weld fitting to the tank wall of a water storage tank are provided. The threaded weld fitting comprises a body defining an aperture and having a facing surface configured to be positioned facing the tank wall. A female thread is formed along the aperture. A first beveled surface portion of the facing surface extends from an edge of the body. A landing surface portion of the facing surface extends from the first beveled surface portion toward a longitudinal axis of the aperture. A second beveled surface portion of the facing surface extends from the landing surface and to the female thread. The landing surface portion and the second beveled surface portion together define an open annular area positioned to receive a portion of a weld formed by welding the threaded weld fitting to the tank wall.

4 Claims, 5 Drawing Sheets

WATER HEATER THREADED WELD FITTING HAVING IMPROVED WELD INTEGRITY

CROSS REFERENCE TO RELATED APPLICATIONS

This application is a Divisional of U.S. application Ser. No. 12/358,842 filed on Jan. 23, 2009, which is incorporated herein by reference in its entirety.

FIELD OF THE INVENTION

The present invention relates to a threaded weld fitting such as a spud or nipple for use in forming a water heater tank weldment and a method of welding the fitting to a wall of the tank.

BACKGROUND OF THE INVENTION

Metallic tanks such as water heater tanks, include tank openings and threaded weld fittings supported at the tank openings. One type of threaded weld fitting is a threaded weld spud or a metal pipe nipple welded to the outside of the tank over a tank opening. Examples of threaded weld spuds are disclosed in U.S. Pat. No. 5,158,200 to Vago et al. and U.S. Pat. No. 5,431,296 to Lewis, which are incorporated by reference herein in their entirety.

The threaded weld spud typically includes internal threads for receiving a threaded portion of a cold water supply line, a hot water supply line, or a sacrificial anode, for example. Welding the threaded weld spud onto a wall of the water heater tank could potentially result in the expulsion of molten material onto the internal threads of the spud, consequently damaging the internal threads of the spud and complicating threaded engagement between the spud and its mating component (a water supply line, for example).

Undesirable expulsion of molten material onto the internal threads of the spud could potentially damage the welded spud, rendering it useless, necessitating costly and labor intensive rework or replacement of the threaded weld spud and/or the entire tank. For those reasons, improvements to threaded weld spuds and improved methods of welding threaded weld spuds to tank walls are continually sought by tank manufacturers in the interests of performance, manufacturability, cost and/or time.

SUMMARY OF THE INVENTION

In one exemplary aspect of the invention, a threaded weld fitting configured to be aligned with an opening defined in a tank wall and welded to the tank wall to form a water heater tank weldment is provided. The threaded weld fitting comprises a body defining an aperture along a longitudinal axis of the body and having a facing surface configured to be positioned facing the tank wall. A female thread is formed along at least a portion of the aperture and is configured for threadedly receiving a male thread of a mating part. A weld projection is defined on the facing surface of the body and includes an edge configured to be positioned against the tank wall. A first beveled surface portion of the facing surface extends from the edge of the weld projection. A landing surface portion of the facing surface extends from the first beveled surface portion toward the longitudinal axis of the body. The landing surface portion is oriented at an angle with respect to the first beveled surface portion and is substantially orthogonal to the longitudinal axis of the body. A second beveled surface portion of the facing surface extends from the landing surface and to the female thread. The landing surface portion and the second beveled surface portion of the facing surface together define an open annular area positioned to receive a portion of a weld formed by welding the threaded weld fitting to the tank wall.

In another exemplary aspect of the invention, a water heater tank weldment is provided. The water heater tank weldment comprises a water storage tank having a tank wall and an opening defined in the tank wall and a threaded weld fitting positioned over the opening defined in the tank wall. A weld joins the threaded weld fitting to the tank wall of the water storage tank. The weld consumes at least a portion of the first beveled surface portion of the facing surface, at least a portion of the weld extending into an annular area defined between the tank wall of the water storage tank, the landing surface portion of the facing surface of the threaded fitting and the second beveled surface portion of the facing surface of the threaded fitting.

In yet another exemplary aspect of the invention, a method of welding a threaded weld fitting to a tank wall of a water storage tank to form a water heater tank weldment is provided. The method comprises the step of positioning an edge of a weld projection of a facing surface of a threaded weld fitting against the tank wall, thereby forming an annular area defined at least in part by the tank wall, the first beveled surface portion, the landing surface portion, and the second beveled surface portion. Heat is applied to the weld projection of the threaded weld fitting and the wall section of the tank, thereby forming a weld at least partially consuming the first beveled surface portion and extending into the annular area.

In still another exemplary aspect of the invention, another threaded weld fitting configured to be aligned with an opening defined in a tank wall and welded to the tank wall is provided. The threaded weld fitting comprises a body defining an aperture along a longitudinal axis of the body and having a facing surface configured to be positioned facing the tank wall. A female thread is formed along at least a portion of the aperture and configured for threadedly receiving a male thread of a mating part. A weld projection is defined on the facing surface of the body and includes an edge configured to be positioned against the tank wall. A first beveled surface portion of the facing surface extends from the edge of the weld projection. A second beveled surface portion of the facing surface extends from the first beveled surface portion to the female thread, wherein an angle defined between the first beveled surface portion and second beveled surface portion is between about 160 degrees and about 165 degrees.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE DRAWINGS

Exemplary features of selected embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the exemplary configurations and materials and sizes described hereafter can be modified within the scope of this invention.

Figure 1:
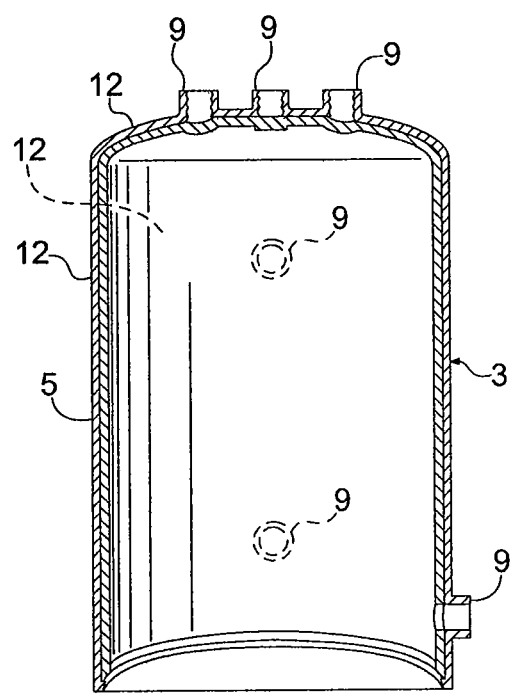
FIG. 1 is a cross-sectional side view of an embodiment of a water heater tank weldment including threaded weld spuds welded over openings provided along walls of a water heater tank, according to aspects of this invention.

FIG. 1 depicts a cross-sectional view of a water heater tank weldment generally designated by the numeral "3." The water tank weldment 3 generally comprises a water storage tank 5 having a plurality of threaded weld spuds 9 applied to corresponding openings defined on the walls 12 of the water tank 5. Each threaded weld spud 9 is used to support a water supply pipe, an inlet dip tube, an outlet dip tube, a temperature and pressure relief valve, an electrical heating element, a thermostat, a sacrificial anode, or a drain valve, for example. A threaded weld spud of a water heater may be referred to in the art as a spud, a weld spud, a nipple, a fitting, a threaded weld fitting, or a connector, by way of example. These terms may be used interchangeably hereinafter.

Although not shown in FIG. 1, a water heater may include means for heating water within the tank, such as one or more electric heating elements, or a combustion chamber and a flue positioned within the tank to transfer heat from products of combustion to water within the tank.

Figure 2:
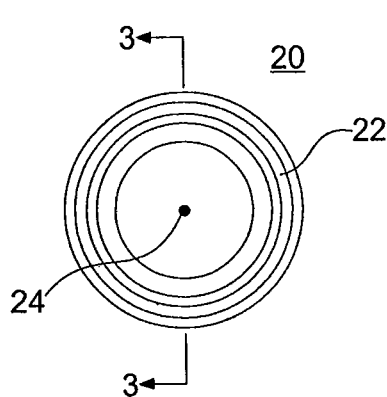
FIG. 2 is a top plan view of a threaded weld spud, according to a first exemplary embodiment of the invention.
Figure 3:
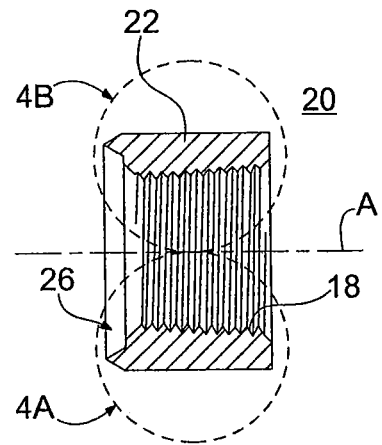
FIG. 3 is a cross-sectional side view of the threaded weld spud of FIG. 2 taken along the lines 3-3.
Figure 4A:
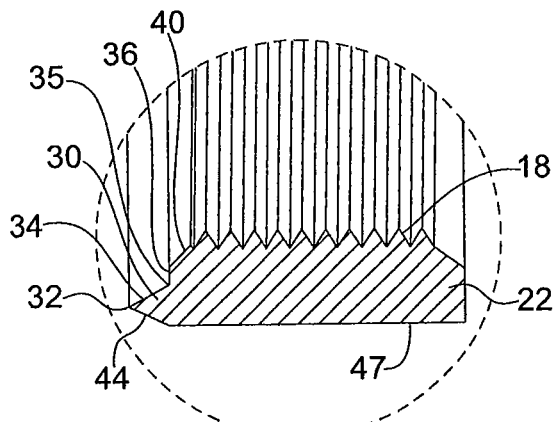
FIGS. 4A and 4B are detailed views of the threaded weld spud of FIG. 3.
Figure 4B:
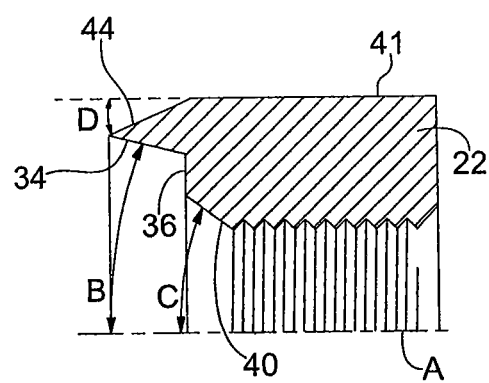

FIGS. 2-4 depict a first exemplary embodiment of a threaded weld spud 20. The weld spud 20 includes a body 22 defining an aperture 24 along a longitudinal axis "A" of the body 22. The body 22 is ring-shaped. The body 22 may also be formed in other suitable shapes. The body 22 is composed of carbon steel. Those skilled in the art will recognize that the body 22 may be composed of any non-corrosive material, such as stainless steel or a polymer, for example.

A female thread 18 is formed along a portion of the aperture 24 of the body 22. The female thread 18 is configured for threadedly receiving a male thread of a mating part (not shown), such as a water supply pipe, an inlet dip tube, an outlet dip tube, a temperature and pressure relief valve, an electrical heating element, a thermostat, a sacrificial anode, or a drain valve, for example. By way of example, the female thread 18 may include National Pipe Threads (NPT) or any other thread type known to those skilled in the art.

The body 22 of the weld spud 20 includes a facing surface 26 that is configured to be positioned facing a tank wall 12 (see FIG. 1). The facing surface 26 generally includes a first beveled surface portion 34, a landing surface portion 36, a second beveled surface portion 40 and a third beveled surface portion 44, as described hereinafter.

A weld projection 30 is defined on the facing surface 26 of the body 22. The weld projection 30 includes the first beveled surface portion 34 and the third beveled surface portion 44. The first beveled surface portion 34 and the third beveled surface portion 44 meet at an edge 32 of the weld projection 30. The edge 32 is configured to be positioned against the tank wall 12. Although not shown, all or a portion of the weld projection 30 is consumed once weld spud 20 is welded to the tank wall 12. The exposed annular area "G" may be filled upon welding or not (as shown).

The first beveled surface portion 34 of the facing surface 26 extends from the edge 32 of the weld projection 30 toward the longitudinal axis "A". According to this embodiment of the invention, an angle "B" defined between the longitudinal axis "A" and the first beveled surface portion 34 is between about 20 degrees and about 40 degrees. More preferably, the angle "B" is about 30 degrees.

A landing surface portion 36 of the facing surface 26 extends from the first beveled surface portion 34 toward the longitudinal axis "A" of the threaded weld fitting 20. By way of contrast to the weld spud shown in FIG. 43 of U.S. Pat. No. 5,158,200, for example, an internal groove (item 146) is formed in the fitting (item 142) to accommodate a sleeve (item 150). The sleeve (item 150) is provided to prevent the introduction of molten material onto the threads (item 144) of the fitting (item 142).

Referring still to FIGS. 2-4, a radius 35 is defined at the intersection of the landing surface portion 36 and the first beveled surface portion 34. According to this embodiment, the radius may be about 0.030 inches. Alternatively, the radius 35 may be omitted from the facing surface 26 altogether. The landing surface portion 36 is oriented at an angle with respect to the first beveled surface portion 34 and is oriented substantially orthogonal to the longitudinal axis "A" of the threaded weld fitting 20.

Figure 11:
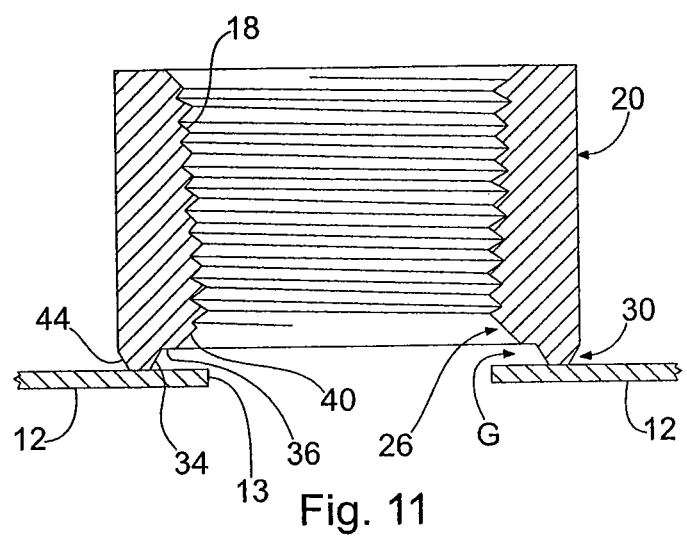
FIG. 11 is a cross-sectional side view of a threaded weld spud welded to a tank wall.

According to this embodiment of the invention, the angle defined between the landing surface portion 36 and a plane that is orthogonal to the longitudinal axis is between about 0 degrees and about two degrees in a clockwise direction (i.e., angled towards the female thread 18). In assembled form, the landing surface portion 36 is substantially parallel to the tank wall 12, as best shown in FIG. 11.

A second beveled surface portion 40 of the facing surface 26 extends from the landing surface portion 36 to the female thread 18. According to this embodiment of the invention, an angle "C" defined between the longitudinal axis "A" and the second beveled surface portion 40 is between about 45 degrees and about 70 degrees. More preferably, the angle "C" is about 45 degrees. Additionally, according to this embodiment of the invention, the angle "C" differs from angle "B" with respect to the longitudinal axis "A."

A third beveled surface portion 44 of the facing surface 26 also forms part of the weld projection 30. The third beveled surface portion 44 extends from the edge 32 to the revolved outer surface 47 of the body 22. The third beveled surface portion 44 and the first beveled surface portion 34 meet at the edge 32 of the weld projection 30. According to this embodiment of the invention, an angle "D" defined between the third beveled surface portion 44 and the revolved outer surface 47 of the body 22 is between about 25 degrees and about 35 degrees. More preferably, the angle "D" is about 30 degrees.

Figure 5:
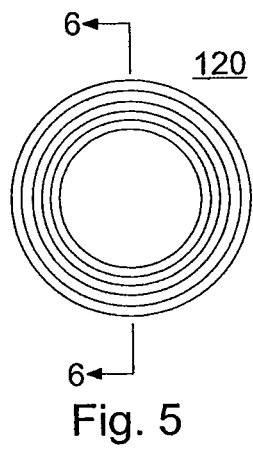
FIG. 5 is a top plan view of a threaded weld spud, according to a second exemplary embodiment of the invention.
Figure 6:
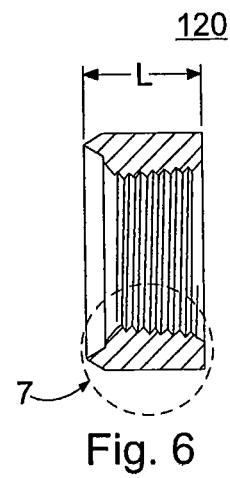
FIG. 6 is a cross-sectional side view of the threaded weld spud of FIG. 5 taken along the lines 6-6.
Figure 7:
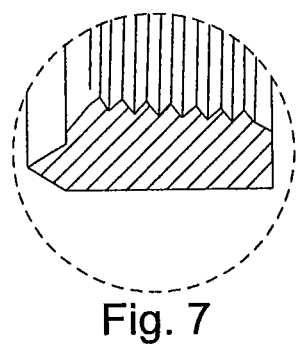
FIG. 7 is a detailed view of the threaded weld spud of FIG. 6.

FIGS. 5-7 depict a second exemplary embodiment of a threaded weld spud 120. The threaded weld spud 120 is substantially similar to the threaded weld spud 20 depicted in FIGS. 2-4, with the exception that the length "L" of the threaded weld spud 120 is greater than the length of the threaded weld spud 20 of FIGS. 2-4. The length "L" of a threaded weld spud may be set to any desired dimension. By way of example, the length "L" of a weld spud may vary between about ½ inch to about 1 inch.

Figure 8:
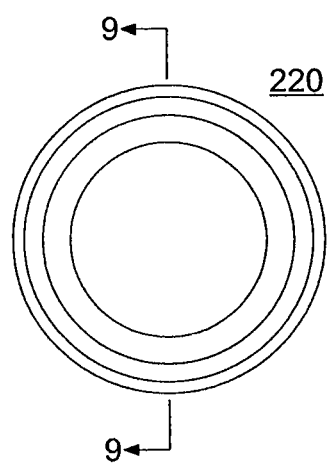
FIG. 8 is a top plan view of a threaded weld spud, according to a third exemplary embodiment of the invention.
Figure 9:
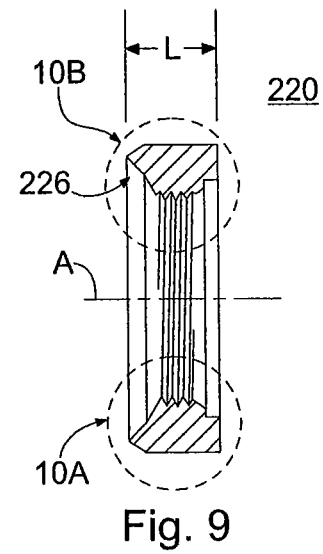
FIG. 9 is a cross-sectional view of the threaded weld spud of FIG. 8 taken along the lines 9-9.
Figure 10A:
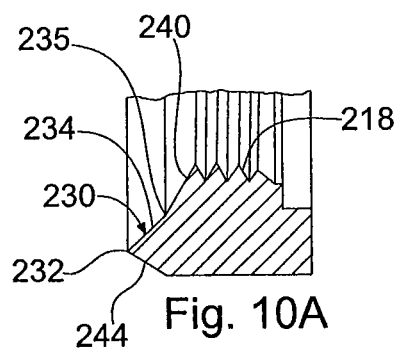
FIGS. 10A and 10B are detailed views of the threaded weld spud of FIG. 9.
Figure 10B:
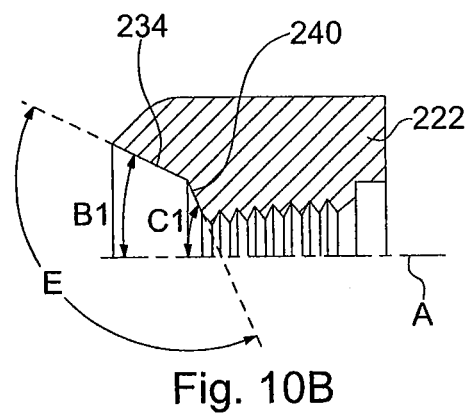

FIGS. 8-10 depict a third exemplary embodiment of a threaded weld spud 220. The threaded weld spud 220 is similar to the threaded weld spud 20 depicted in FIGS. 2-4, however, the facing surface 226 of the threaded weld spud 220 does not include a landing surface portion and the length "L" of the spud 220 is less than the length of spud 20.

The facing surface 226 of spud 220 generally includes a first beveled surface portion 234, a second beveled surface portion 240 extending from the first beveled surface portion 234, and a third beveled surface portion 244 extending from an opposite side of the first beveled surface portion 234. A weld projection 230 is defined on the facing surface 226 of the body 222. The weld projection 230 includes the first beveled surface portion 234 and the third beveled surface portion 244. The first beveled surface portion 234 and the third beveled surface portion 244 meet at an edge 232 of the weld projection 230. Like edge 32, the edge 232 is configured to be positioned against the tank wall 12 (see FIG. 1).

The first beveled surface portion 234 of the facing surface 226 extends from the edge 232 of the weld projection 230 towards the longitudinal axis "A." According to this embodiment of the invention, an angle "B1" defined between the longitudinal axis "A" and the first beveled surface portion 234 is between about 40 degrees and about 50 degrees. More preferably, the angle "B1" is about 45 degrees.

A second beveled surface portion 240 of the facing surface 226 extends from the first beveled surface portion 234 to the female thread 218. An optional radius 235 is defined at the intersection of the first beveled surface portion 234 and the second beveled surface portion 240. According to this embodiment of the invention, an angle "C1" defined between the longitudinal axis "A" and the second beveled surface portion 240 is between about 55 degrees and about 65 degrees. More preferably, the angle "C1" is about 60 degrees. Additionally, according to this embodiment of the invention, the angle "C1" differs from angle "B1" with respect to the longitudinal axis "A."

According to this embodiment of the invention, an angle "E" defined between the first beveled surface portion 234 and the second beveled surface portion 240 is between about 160 and about 165 degrees. More preferably, the angle "E" is about 165 degrees.

FIG. 11 depicts a detailed view of the threaded weld spud 20 of FIGS. 2-4 welded to a tank wall 12. An exemplary method of welding a threaded weld fitting 20 onto a tank wall 12 is described hereinafter within reference to FIGS. 3 and 11. The female thread 18 of the weld fitting 20 is first aligned with an opening 13 defined in the tank wall 12. The edge 32 of the weld projection 30 of the threaded weld fitting 20 is then positioned against the tank wall 12 thereby defining an exposed annular area "G" between the tank wall 12 and the facing surface 26 of the threaded weld fitting 20. The landing surface portion 36 and the second beveled surface portion 40 together define the exposed annular area "G" which is sized to receive molten material in a welding operation of the threaded weld fitting 20 to the tank wall 12, as described hereinafter. Optionally, as shown in FIG. 11, the first beveled surface 34 may also form part of the exposed annular area "D" after the weld fitting 20 is welded to the tank wall 12.

Heat is then applied to the weld projection 30 of the threaded weld fitting 20 and the tank wall 12 thereby at least partially consuming the first beveled surface portion 34 and distributing molten material into the exposed annular area "G". Heat may be applied to the tank wall 12 and the weld spud 20 by way of a resistance welding operation, or any other type of welding operation.

By virtue of the geometry of the facing surface 26 of the weld spud 20, the exposed annular area "G" readily receives and encapsulates the molten material in a resistance welding operation. More importantly, the facing surface 26, by virtue of its unique geometry and sizing, is uniquely configured to limit or prevent the introduction of molten material onto the threads 18 of the weld spud. In other words, during a welding operation, molten material is contained within the exposed annular area "G" without settling on the threads 18 of the weld spud 20. As background, exposing the threads of a weld spud to molten material may compromise the threads of the weld spud, consequently requiring both costly and time-consuming rework or replacement of the weld spud and/or the entire tank assembly.

By way of contrast, in the fitting assembly shown in FIGS. 43 and 44 of U.S. Pat. No. 5,158,200, for example, a sleeve (item 150) is inserted within an internal groove (item 146) of the fitting (item 142) to prevent the introduction of molten material onto the threads (item 144) of the fitting (item 142). Unlike the fitting assembly of U.S. Pat. No. 5,158,200, the exemplary weld fittings 20, 120 and 220 described herein do not require a sleeve, an internal groove to accommodate a sleeve, or any other supplemental component used to limit or prevent the introduction of molten material onto the threads 18. Although a sleeve is optionally used, it is rendered unnecessary by this invention.

Referring still to FIGS. 3 and 11, as an optional step of the tank assembly fabrication process, the interior of the tank wall 12 is coated with enamel and then heated to a predetermined temperature to produce a glass-lined tank wall 12. In between the coating and heating steps, the enamel is removed from the female thread 18.

The embodiments of the threaded weld fittings 20, 120 and 220 confer several benefits. For instance, it has been discovered that the unique geometry of the facing surface of at least one of those threaded weld fitting embodiments resulted in the following manufacturability and quality improvements: (1) reduction or elimination of weld flash (commonly referred to as squirt-out or weld spatter) onto the internal threads of the weld fitting; (2) reduction or elimination of water leakage at the weld interface between the weld fitting and the tank wall; (3) reduction of the working head pressure of the resistance weld machine from about 80 psi to about 65 psi thereby increasing the service life of the resistance weld machine; (4) reduction or elimination of the step of pre-grinding the weld fitting to remove scale; (5) improved visualization of the weld at the weld interface between the weld fitting and the tank wall because the weld interface is proximal to the outer diameter of the spud; and (6) reduction of the heat input required to weld the weld fittings onto the tank wall during the resistance welding operation.

Although this invention has been described with reference to exemplary embodiments and variations thereof, it will be appreciated that additional variations and modifications can be made within the spirit and scope of this invention. Although this invention may be of particular benefit in the field of residential and commercial water heaters, it will be appreciated that this invention can be beneficially applied in connection with any tank.

What is claimed:

1. A method of welding a threaded weld fitting to a tank wall of a water storage tank to form a water heater tank weldment, the method comprising the steps of:

positioning an edge of a weld projection of a facing surface of a threaded weld fitting against the tank wall, thereby forming an annular area defined at least in part by (a) the tank wall, (b) a first beveled surface portion of the facing surface extending from the edge of the weld projection, (c) a landing surface portion of the facing surface extending from the first beveled surface portion toward a longitudinal axis of the threaded weld fitting and oriented at an angle with respect to the first beveled surface and substantially parallel to the tank wall, and (d) a second beveled surface portion of the facing surface extending from the landing surface portion to a female thread of the threaded weld fitting; and applying heat to the weld projection of the threaded weld fitting and the tank wall, thereby forming a weld at least partially consuming the first beveled surface portion of the facing surface of the threaded weld fitting and extending into the annular area, wherein the positioning step is completed without positioning a sleeve in the threaded weld fitting to shield the female threads of the threaded weld fitting from the weld.

2. The method of claim 1 further comprising the step of applying an enamel coating to an interior region of the tank.

3. The method of claim 2 further comprising the step of removing enamel from the female thread defined on the threaded weld fitting and exposing the tank and the threaded weld fitting to heat to cure the enamel coating.

4. The method of claim 1 wherein the positioning step further comprises the step of aligning the longitudinal axis of the body of the threaded weld fitting with a center of an opening defined in the tank wall.

* * * * *